United States Patent
Kolb

(10) Patent No.: US 11,891,207 B2
(45) Date of Patent: Feb. 6, 2024

(54) CONTAINER TREATMENT MACHINE AND METHOD FOR ALIGNING A CONTAINER IN A CONTAINER RECEPTACLE OF A CONTAINER TREATMENT MACHINE

(71) Applicant: KRONES AG, Neutraubling (DE)

(72) Inventor: Herbert Kolb, Hausen (DE)

(73) Assignee: KRONES AKTIENGESELLSCHAFT, Neutraubling (DE)

( * ) Notice: Subject to any disclaimer, the term of this patent is extended or adjusted under 35 U.S.C. 154(b) by 0 days.

(21) Appl. No.: 17/998,004

(22) PCT Filed: Apr. 23, 2021

(86) PCT No.: PCT/EP2021/060615
§ 371 (c)(1),
(2) Date: Nov. 4, 2022

(87) PCT Pub. No.: WO2021/224020
PCT Pub. Date: Nov. 11, 2021

(65) Prior Publication Data
US 2023/0202699 A1 Jun. 29, 2023

(30) Foreign Application Priority Data
May 6, 2020 (DE) .................. 10 2020 112 191.1

(51) Int. Cl.
*B32B 41/00* (2006.01)
*B65C 9/06* (2006.01)
(Continued)

(52) U.S. Cl.
CPC ............... *B65C 9/067* (2013.01); *B65C 3/08* (2013.01); *B65C 9/40* (2013.01)

(58) Field of Classification Search
CPC .............. B65C 9/067; B65C 3/08; B65C 9/40
(Continued)

(56) References Cited

U.S. PATENT DOCUMENTS 7,331,152 B2 2/2008 Menke

FOREIGN PATENT DOCUMENTS

DE 102008053876 A1 5/2010
DE 102008059229 A1 6/2010
(Continued)

OTHER PUBLICATIONS

ISA European Patent Office, International Search Report Issued in Application No. PCT/EP2021/060615, dated Jul. 7, 2021, WIPO, 4 pages.

*Primary Examiner* — Michael N Orlando
*Assistant Examiner* — Joshel Rivera
(74) *Attorney, Agent, or Firm* — McCoy Russell LLP

(57) ABSTRACT

A container treatment machine comprises a treatment unit, for the treatment of containers, and container receptacles, in which containers can be received such that they can rotate about an axis, the container treatment machine comprising a camera, for capturing an image of a container transported upstream of the treatment unit in a container receptacle, and an alignment module, the alignment module being designed to rotate a container into a target position by actuating the container receptacle. The alignment module comprises a neural network, which, by processing the image of a container transported upstream of the treatment unit in a container receptacle, can determine a necessary rotation of the container from the current position of same to the target position, and the alignment module can control the rotation of the container receptacle on the basis of the determined rotation.

12 Claims, 3 Drawing Sheets

(51) Int. Cl.
*B65C 3/08* (2006.01)
*B65C 9/40* (2006.01)

(58) Field of Classification Search
USPC .................... 156/60, 64, 350, 351, 378, 379
See application file for complete search history.

(56) References Cited

FOREIGN PATENT DOCUMENTS

| | | |
|---|---|---|
| DE | 202011108761 U1 | 2/2012 |
| DE | 102011007520 A1 | 10/2012 |
| DE | 102011083377 A1 | 3/2013 |
| EP | 2251269 A2 | 11/2010 |
| NL | 2013723 B1 | 10/2016 |
| WO | 2019059773 A1 | 3/2019 |
| WO | 2019167884 A1 | 9/2019 |

CONTAINER TREATMENT MACHINE AND METHOD FOR ALIGNING A CONTAINER IN A CONTAINER RECEPTACLE OF A CONTAINER TREATMENT MACHINE

CROSS REFERENCE TO RELATED APPLICATIONS

The present application is a U.S. National Phase of International Application No. PCT/EP2021/060615 entitled "CONTAINER TREATMENT MACHINE AND METHOD FOR ALIGNING A CONTAINER IN A CONTAINER RECEPTACLE OF A CONTAINER TREATMENT MACHINE," and filed on Apr. 23, 2021. International Application No. PCT/EP2021/060615 claims priority to German Patent Application No. 10 2020 112 191.1 filed on May 6, 2020. The entire contents of each of the above-listed applications are hereby incorporated by reference for all purposes.

TECHNICAL FIELD

The present invention relates to a container treatment machine and to a method for aligning a container in a container receptacle of a container treatment machine.

BACKGROUND AND SUMMARY

It is known from the prior art that containers, for example after leaving a rinsing machine or a blow molding machine and being fed to a machine in which they must arrive with a defined orientation, are aligned before they can be fed to the actual treatment in the downstream container treatment machine.

The desired orientation, also called target attitude, may depend, for example, on certain physical features of the surface of the container, such as forming seams, indentations or bulges or the like.

From EP 2 251 269 and DE 10 2011 007 520 there are known methods, with which alignment of the container is realized by picking up a container and by means of a camera during complete rotation or at least during such a long rotation until an product feature is detected. Based on a detected feature, the container is rotated in such a way that it may be brought into the target attitude or position.

However, this requires precise knowledge of the surface of the container and the recognition of such a specific product feature.

Moreover, it is necessary that the specific target attitude be specified by a user. This requires considerable experience on the part of the user, since slightly incorrect specification of the actual target attitude relative to, for example, a print head may have a significant adverse effect on the result of the print.

Moreover, the process referred to in the described documents is not suitable for drawing conclusions for future containers from a series of already examined and aligned containers, or even for taking into account previously unprocessed alignment features, so that a complete examination of the container is always necessary.

This ensures that the efficiency of the process in the known prior art may only be increased up to a limit essentially determined by the skills of the operator.

Object

Based on the known prior art, the object to be solved is thus to specify a method and a container treatment machine for aligning a container before carrying out a treatment step on the container, which are able to realize the alignment of the container with high reliability and low effort for the operator, wherein the method also responds as reliably as possible to variations of alignment features.

Solution

According to the invention this object is addressed by the container treatment machine and the method for aligning a container in a container receptacle of a container treatment machine.

The container treatment machine according to the invention for treating containers, such as bottles, cans or the like, is characterized in that the alignment module includes a neuronal network which, by processing the image of a container transported in a container receptacle upstream of the treatment unit, may determine a necessary rotation of the container from its current position to the target attitude, and the alignment module may control the rotation of the container receptacle as a function of the determined rotation.

According to the invention, the target attitude is the orientation of the container, under which the container is to be treated. The treatment of the container may be, for example, the application of a decorative element or an inspection process or the like, wherein the treatment essentially depends on the correct alignment of the container. In particular, the target attitude may be defined by an alignment feature on the surface of the container in the form of a physical characteristic. For example, this may include that a label is wound around the container starting at a forming seam of the container. For this purpose, however, the container with the forming seam has to be moved into a position suitable for the labeling unit, so that the suitable position of the forming seam defines the target attitude.

The current position of the container is the position that the container assumes before it is aligned and before it is subjected to treatment in the treatment unit, so that it is possible to align the container from its current position to the target attitude before the begin of the treatment.

This results in the necessary rotation as the differential angle between the current alignment and the target attitude.

According to the invention, the neural network is configured to compare the current position with the target attitude preferably on the basis of pattern recognition, for example by recognizing certain surface characteristics by the neural network and translating them into recognition of a current position compared with the target attitude.

The differential angle determined by the neural network and/or the alignment module may then be used to control the rotation of the container receptacle by the alignment module, where the recognition of the necessary rotation by the neural network is robust even in case of small deviations of shape/color/size of the containers and further requires little additional input by the operator.

The container treatment machine, and in particular the use of a neural network, may also be used in determining a necessary rotation if the containers to be rotated have embossments in the material, such as elements embossed in glass or plastic, such as coats of arms, symbols, logos or the like, in particular those with a "hand-crafted" appearance, i.e. which look as if they have been manually embossed. Due to the transparency of the material of the container and the non-constant shape of such embossing, they are difficult and unreliable to identify with common image processing programs.

By using a neural network with the properties according to the invention, the determination of the necessary rotation of the container may also be done with regard to such an embossing or based on such an embossing. Independent of the rotation, it is possible with the neural network to recognize the embossing on the container, for example, in order to obtain further information about the quality of the embossing, independent of the rotation to be performed.

Furthermore, by using a learning neural network, the container treatment machine of the invention may take into account characteristics of the containers that change slightly over time, such as the changing shape of the forming seams due to wear of the blow molds. Neural networks are able to learn over time and thus flexibly use changing container characteristics (e.g. within a certain tolerance limit due to wear) to determine the necessary rotation.

In embodiments neural network is a Deep Neural Network (DNN) or a Convolutional Neural Network. Deep Neural Networks and in particular Convolutional Neural Networks are particularly well suited for pattern recognition of images and/or surfaces, so that they may be used to recognize particularly well the current positions, in particular of one or more alignment features on the surface of the container, for determining the necessary rotation, which further improves the alignment of the container into its target attitude.

Further, the neural network may be configured to learn current positions of containers relative to a target attitude from images acquired during operation of the container treatment machine.

For example, the neural network may learn from a first attempt to determine the alignment of the container and the necessary rotation if the performed rotation did not result in the correct alignment of the container, for example by taking a second image of the container after the rotation and the neural network examines whether the target attitude was reached. If this is not the case and the target attitude has to be corrected, this may lead to a learning process by suitable design of the neural network, which improves the recognition of the current position and the determination of the necessary rotation continuously during the operation of the machine.

In one embodiment, the target attitude is determined based on an alignment feature of the container.

As described above, the alignment feature may be, in particular, a physical characteristic, such as a forming seam or a material bulge or material indentation, which may be determinative of the further treatment of the container, for example, application of a label or printed image.

Thus, the target attitude may be determined in a simple geometric manner.

In a further variant of this embodiment, the container treatment machine includes an input unit that allows an operator to input a type of container and/or a type of an alignment feature, based on which the neural network may determine the target attitude.

With this embodiment, it is possible for an operator to easily determine the desired result of the rotation, such as the target attitude, without the need for precise input by the operator or even specification of a precise angular attitude with respect to a preferred zero attitude of the container. For example, the input may be designed in such a way that the operator may select between different types of product features, such as forming seam, material bulge, material indentation, notches, points, and the input of this term as an alignment feature is sufficient to communicate to the container treatment machine the necessary information, which is then transferred essentially independently by the alignment module and the neural network into a correct alignment of the containers.

Furthermore, the container treatment machine may include at least one of a labeling machine, a printing machine, a direct printing machine, an inspection machine, a packer. In these machines, the alignment of the container into a particular target attitude is usually important, so that the implementation of the invention in these machines is particularly advantageous.

It may also be provided that the container receptacle includes a turntable and a (rotatable) centering bell, wherein a container may be clamped and rotated between the turntable and the (rotatable) centering bell. With this embodiment of the container receptacle, an effective and easily controllable rotation of the containers is possible.

In a further variant the container is transported by means of a rotatable (around an axis parallel to the longitudinal axis of the container) centering bell (for example a centering bell that may be set in rotation by a servo motor) and is rotated in front of the camera(s). The containers may thus be transported in a suspended manner, thereby also exposing the bottom for being viewed by the camera without interference.

The method according to the invention for aligning a container in a container receptacle of a container treatment machine, wherein the container is aligned to a target attitude, is characterized in that the alignment module includes a neural network which, by processing the image of the container transported in a container receptacle upstream of the treatment unit, determines a necessary rotation of the container from its current position to the target attitude, and the alignment module controls the rotation of the container receptacle in dependence on the determined rotation.

According to the method of the invention, the rotation of the container to the target attitude takes place before the treatment is carried out in the treatment unit. This does not necessarily mean that the rotation of the container into the target attitude also takes place before the treatment unit is reached. The container may also be rotated while the container is already positioned within reach of the treatment unit, but the treatment unit has not yet started treatment.

This method realizes a simple but reliable alignment of the container.

In one embodiment, the neural network is a pre-learned neural network.

Pre-learning the neural network, i.e. training the neural network on one or more alignment features and target attitudes of containers or container types, ensures that even when the container treatment machine is put into operation, substantially completely correct alignment of the containers into the target attitude is possible starting from any position.

Furthermore, the neural network may be designed to learn current positions of containers in relation to a target attitude from images of containers taken during operation of the container treatment machine.

Even with a pre-learned neural network, this embodiment may result in pattern recognition of the surface of the container and thus further processing, such as determination of the necessary rotation, is improving further over the operating time. Thus, errors may be further minimized.

In one embodiment, the container treatment machine includes an input unit with which an operator inputs a container type and/or an alignment feature type, and wherein based on the input container type and/or the input alignment feature, the neural network determines the target attitude.

This embodiment provides, in a manner that is less prone to error, a means for providing the container treatment machine and, in particular, the alignment module and the neural network with the necessary information for determining the target attitude and the necessary rotation.

In one embodiment, the neural network for determining the rotation in exactly one image of the container in its current position searches, in a first step, for an alignment feature, by means of which the target attitude of the container is defined and, if the alignment feature is found at least partially in the image of the container, the neural network determines the rotation from the position of the alignment feature in the image and the target attitude of the alignment feature; and wherein in a second step, if the alignment feature is not found at least partially in the exact one image, the neural network determines a possible position of the alignment feature based on the information present in the image and the alignment module causes a rotation of the container in the container receptacle based on the possible position of the alignment feature, wherein, in a third step, a second image of a container is taken in the rotated position and the neural network searches for the alignment feature in the second image and, if the alignment feature is found at least partially in the image of the container, it determines the rotation from the position of the alignment feature in the image and the target attitude of the alignment feature.

With this embodiment, a "self-correction" of the neural network is realized, since the neural network may check the result it has determined in the second and third steps and, for example, can correct the first result in a subsequent first step. This, in combination with a learning process of the neural network, may contribute to the improvement of the method for aligning the containers.

In a further variant of this embodiment, the neural network learns from a result of the second step and the third step. Hereby, the advantage discussed above is realized.

DETAILED DESCRIPTION

Figure 1:
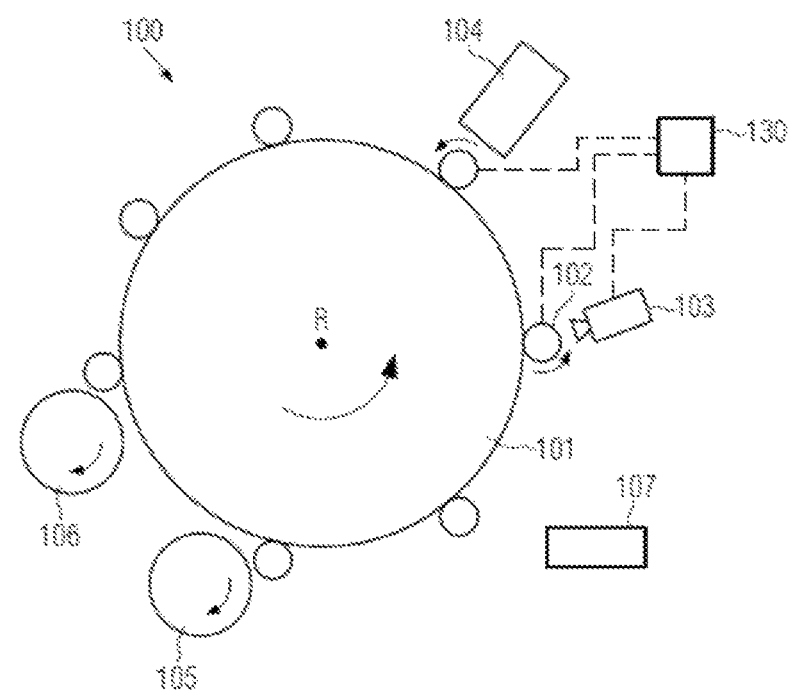
FIG. 1 shows a container treatment machine according to one embodiment

FIG. 1 shows a container treatment machine 100 according to one embodiment of the invention. This container treatment machine may be configured, for example, as a labeling machine or a direct printing machine. However, the invention is not limited with respect to the specific choice of the container treatment machine 100 or its configuration. The only proviso is that the container treatment machine is such a container treatment machine that requires a specific alignment of a container before it is treated by a treatment unit 104.

For example, for applying labels by means of a treatment unit 104 configured as a labeling unit, it may be contemplated that one side of the label is applied to a forming seam of a plastic container, such as one made of PET, and the remainder of the label is wrapped around the container at least partially starting therefrom. However, the containers are usually fed to such a labeling machine in a non-aligned manner, so that subsequent alignment is required before the label is applied.

This also applies to other implementations of container treatment machines, wherein inspection machines also fall under this category.

In principle, it is intended that the container treatment machines also include a container receptacle 102 in addition to a treatment unit. By means of this container receptacle, containers may be removed, for example, from a feed device 105 and transferred, in particular, to the active area of the treatment unit 104, in which the treatment of the container (for example, the application of the label or the printing of a printed image on the container) is carried out.

According to one embodiment, the container is rotated into the target attitude (i.e. into the desired position of the container) at least before the start of the actual treatment step to be performed by the treatment unit 104, wherein the container is preferably rotated about its longitudinal axis.

In this regard, the longitudinal axis is the axis along the longest extent of the container and, in particular, extends from a bottom of the container, on which the container is typically placed, in the direction of the opening of the container. The container receptacle may, for example, include a rotary plate and a centering bell associated therewith, between which the container is clamped. This is known in particular for plastic bottles or cans. However, the invention is not limited in this respect and other variants for transporting and/or rotating the container are also conceivable here, for example with neck-handling apparatuses that may turn the container over on its support ring.

In order to move the container to the desired target attitude, the current alignment of the container must be known so that determination may be made by how much the container has to be rotated about its axis. For this purpose, the container treatment machine includes a capturing device, in particular a camera 103, with which at least one image of the container may be captured while it is in its current position or alignment.

This captured image is then fed from the camera to an alignment module 130. This alignment module may be understood in the sense of a control unit or at least include a control unit and is configured to process the captured image of the container in order to determine the necessary rotation of the container starting from its current position to the target attitude. Furthermore, the alignment module is preferably configured to control the rotation of the container receptacle as a function of the necessary rotation determined in this way, for example by controlling a servo drive of the container receptacle and causing it to rotate the container in the container receptacle by a specific angle.

According to the invention, the alignment module includes a neural network that processes the image taken by the camera 103 (or an image pre-processed in some way, as will be described further below), and by means of this processing, in particular a pattern recognition, the alignment module recognizes the current position of the container and, based on this, determines the necessary rotation.

Thereby, according to one embodiment, the necessary rotation is ultimately determined by the position of a certain alignment feature on the surface of the container in its current position compared to the position of this alignment feature in the target attitude.

According to the invention, the neural network is trained to use image recognition or pattern recognition to recognize the current position of the alignment feature or another structure of the container that allows conclusions to be drawn about the current position of the alignment feature, and to derive from this the necessary rotation of the container to bring the alignment feature into the desired position.

The alignment feature may be, as already mentioned above, for example a forming seam. However, other physical characteristics of the container, such as the position of material bulges or indentations, embossing, certain markings (already applied by digital printing techniques in a previous step, for example) or the like are also conceivable here. The invention is not limited in this respect. However, it must be possible in principle to determine the current position of the container on the basis of physical properties of the container by taking an image of the container and to compare it with a target attitude.

Once the necessary rotation or rotation angle has been determined to rotate the container from its current position to the target attitude where the alignment feature has the desired position, the alignment module, as mentioned above, controls the relevant container fixture or suitable device to rotate the container such that the container is moved from its current position to the target attitude. Here, treatment may then be carried out by the treatment unit 104.

Also shown in FIG. 1 is an operator terminal 107. This operator terminal allows the operator to interact with the container treatment machine and may serve, for example, as a control unit for the entire container treatment machine. While the operator terminal 107 is shown here separately from the alignment module 130, it may also be provided that the alignment module is integrated into the control unit or operator terminal 107, in particular together with the neural network. By means of the operator terminal 107, an operator may preferably communicate to the container treatment machine and in particular to the alignment module information regarding the container type and/or a type of an alignment feature or a physical characteristic depending on which the neural network is to determine the current position and the target attitude. This may be accomplished by selecting alignment features and/or container types from a list, and is therefore easy for the operator to do, so that error proneness is reduced here. It may also be possible for the operator to select new containers not previously processed by the neural network or the alignment module as the container type here. In this case, it is possible that a training process is initiated in which, for example, new alignment features or the general container type are learned by the neural network, as described with reference to FIG. 3.

In the embodiment illustrated in FIG. 1, only one camera 103 is provided. The container treatment machine shown here is configured as a carousel 101 and is equipped with container receptacles arranged along its periphery. In order to realize an active learning of the neural network also during the operation of the container treatment machine, another camera may be provided along the direction of rotation of the carousel after the camera 103 but before the treatment unit 104, which preferably captures a further image of the container in the "new" current position after the rotation of the container from its current position into the supposed target attitude as determined by the neural network. In order to allow the neural network to learn during operation of the container treatment machine, in one embodiment, this new image may be re-processed by the neural network of the alignment module 130 to check whether, for example, a particular alignment feature that should actually be positioned in the target attitude after the first rotation is actually found in the target attitude. If this is the case, the neural network may learn from this processing of the second image that the previously determined rotation was correct. If this is not the case, the neural network also learns from this and tries a new rotation of the container to reach the target attitude.

In the case of an already pre-trained neural network, it is expected that any deviations from the actual target attitude that may occur will be so minimal that a slight second rotation is very likely to position the container correctly in its target attitude so that it may be treated accordingly by the treatment unit. Since the neural network usually works increasingly more reliably as time progresses during the operation of the container treatment machine due to the learning process, the additional camera not shown here may also be provided, for example, only during an initial period, for example over the first week, of the operation of the container treatment machine. Alternatively or additionally, such an additional camera may also be provided if a new type of container, which has not yet been processed by the neural network, is to be treated by the container treatment machine. With a sufficiently pre-trained neural network, it is possible that the neural network will already rotate the new sort of container, or the new type of container, substantially correctly when the alignment feature used for identification is specified. To improve the quality here as well, the second camera may be used to allow the neural network to learn.

The neural network is preferably a Deep Neural Network and more preferably a Convolutional Neural Network. These networks are particularly well suited for pattern recognition of images and may therefore be used for the invention.

Figure 2:
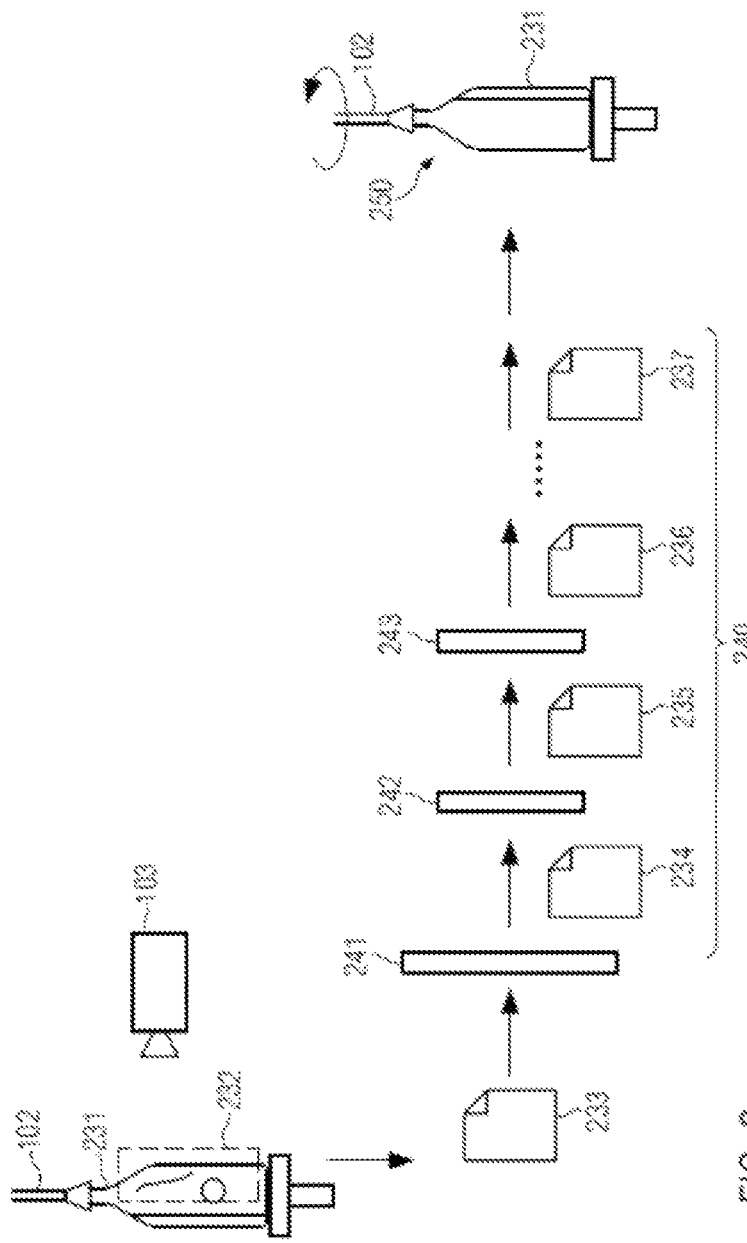
FIG. 2 shows processing of a captured image of a container to determine the rotation angle according to one embodiment

FIG. 2 shows only a schematic representation of image processing in a Convolutional Neural Network for determining the current position of a container and deriving a corresponding rotation angle.

FIG. 2 illustrates this method essentially in the form of a flow diagram with schematic representation of the container and the camera, but is to be understood quite fundamentally as a process sequence within the neural network.

First, one or more images of the container 231 are captured by the camera 103, as already described with reference to FIG. 1. Preferably, this involves rotating the container in front of the camera through an angle of 360° (i.e., a full rotation) and capturing images of the container. In particular, it may be provided that the container is rotated within the camera's capture range (also referred to as the camera's field of view), in which an image of the container is captured, while multiple images 232 of the container are captured by the camera. For example, the images may be captured at certain rotation angles relative to the initial position, such as starting at 0° and then each 90° rotation (i.e., 90°, 180° and 270°). Other rotation angles, such as a shot every 45° during rotation, are also conceivable. Preferably, the container is rotated in front of the camera at least until the identifying feature to be identified may be imaged at least once.

Preferably, the images are rectified and/or processed (for example, the sharpness or contrast is changed) using the means of conventional image processing and/or, in one embodiment, the images may be combined to form a panoramic image.

These images 232 are then provided in the form of a suitable file, such as an image file 233, to the alignment module and here in particular to the neural network 240, which in the embodiment shown here is configured as a Convolutional Neural Network.

A Convolutional Neural Network processes images by stepwise multiplication of a matrix representing the image by a smaller matrix, thereby in each case forming the dot product. The smaller matrix is often referred to as the "kernel" and will be abbreviated as K below.

This may be understood as follows. A matrix M of size S×T serves as a starting point and is multiplied by the matrix K of size P×Q (PCS,QCT). Starting with the first entry of the matrix M, the inner product of a sub-matrix U (of size P×Q) of the image matrix M with the matrix K is determined. Then the indices of the initial entries for forming the inner product are increased by 1 (for example, only the columns and/or only the rows) and again the inner product is determined with the then resulting sub-matrix. These inner products result in exactly one number each. If this number is represented together with the remaining inner products as a new matrix by using the corresponding indices that were used for the determination of the inner product, then a new, reduced matrix R is obtained, which has the size (S−P+1)×(T−Q+1) compared with the initial size of the original matrix M (S×T). Let this be the matrix R, then its entries Rij have in each case the value of the corresponding inner product, which results from the original matrix or image matrix M and the matrix K.

The values of the entries of the matrix K as well as the quantities P and Q of the matrix K are ultimately parameters of the neural network and were usually trained by training procedures, for example on the basis of already known images. According to the previous embodiment, these parameters may also be trained when the already rotated container is measured again.

A Convolutional Neural Network, as shown in FIG. 2, usually includes several layers 241-243 (and further layers not shown separately here), each of which performs a corresponding transformation of the matrix input to them with a corresponding matrix K. The original image is trained accordingly.

Accordingly, the originally input image 233 is further processed by the layers 241-243 of the neural network, resulting in respective "intermediate images" 234-236 and, at the end of the process in the Convolutional Neural Network, a final reduced image 237.

This final image 237 ultimately allows a conclusion to be drawn about the presence or absence and the exact position of a corresponding alignment feature, which the neural network has been trained to recognize. In terms of the invention, this is an alignment feature or other physical characteristic of the container. The reduced image 237 now includes a reduced size corresponding to the pass through the layers of the neural network. However, it may also be expanded back to the initial size, for example, to determine the actual location of the alignment feature or physical characteristic of the container in the image according to the pattern recognition in the neural network.

This final image 237 may then be used by the neural network or, more generally, the alignment module, to determine the current position of the physical characteristic or alignment feature, from which the necessary rotation of the container may then be derived by comparison with the target attitude.

For this purpose, a shift of the final image 237 (i.e., a rotation of the container in the image) may be performed virtually until the alignment feature matches in terms of its position the position of the alignment feature in the target attitude. The virtual rotation performed is then the necessary rotation of the container in the container receptacle to move it from the current position to the target attitude.

After the final image 237 has been determined in FIG. 2, the current position of the container may be determined, as described earlier. Once this is determined, the necessary rotation angle for the container to move it to the target attitude (or to position the alignment feature in the target attitude) may also be determined. In a next step, the alignment module then controls the container receptacle, so that in step 250 a rotation of the container from its current position to the target attitude takes place. As already described, it may also be provided here that a subsequent check is carried out by a second camera as to whether the container is actually positioned in the target attitude, after which a subsequent correction is made possible and at the same time further learning of the neural network may be carried out.

The accuracy, with which the necessary rotation may be determined, depends largely on the state of the neural network and, in particular, its training. A neural network that is not sufficiently trained will usually not determine the position of the alignment feature with a high degree of accuracy and will therefore also not determine the necessary rotation angle correctly when subsequently determining the same. Similarly, an insufficiently trained neural network may incorrectly consider features of the surface of a container as the alignment feature to be searched for, which will also lead to errors in determining the angle.

For this reason, it is necessary to train the neural network before starting operation of the container treatment machine. It is also advantageous to continue learning during the operation of the container treatment machine in order to cause a continuous improvement of the quality of the neural network results.

A learning process carried out before the operation of the container treatment machine but ultimately also a learning process during the operation of the container treatment machine proceed quite basically in such a way that images of containers are made available to the neural network for processing during a learning phase. These may be, for example, images from the running operation, but also images taken from a large database, which are used for learning the neural network (for example, before commissioning the container treatment machine). In addition to these images, the neural network is told which alignment feature or physical characteristic to look for on the surface of the container. Additionally, a target or target attitude of this alignment feature or physical characteristic may be passed to the neural network so that the task of the neural network is to determine the necessary rotation angle.

Figure 3:
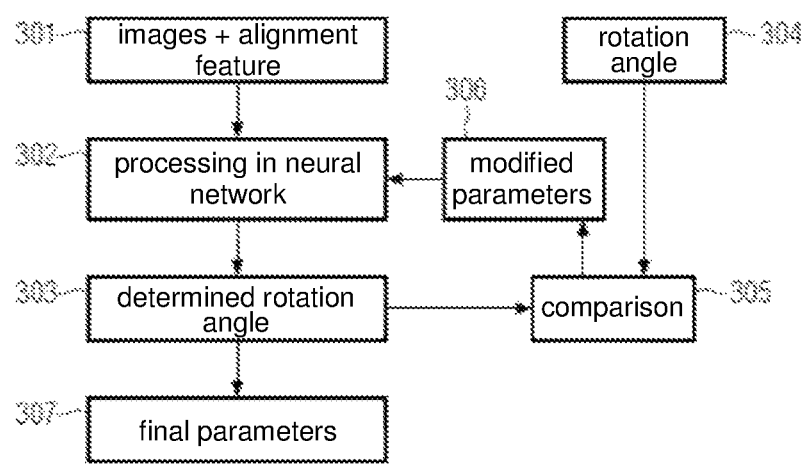
FIG. 3 shows an embodiment of a training method for a neural network

This is done in step 301 according to FIG. 3.

The neural network now processes the images provided to it, usually one after the other, and determines for each image the supposed position of the alignment feature and, if necessary, also derives the necessary rotation angle therefrom. This is done in steps 302 and 303 as shown in FIG. 3. Instead of the rotation angle to be determined, the neural network may also be tasked merely with determining the exact position of the alignment feature. Instead of determining the rotation angle in step 303, the result of the processing by the neural network will then be the determination of the position of the alignment feature.

For a neural network to be trained, the desired results (i.e., in the context of the embodiment of FIG. 3, the rotation angle to be determined) must be known in order to be able to compare the neural network results with the correct results. Therefore, in a next step 305, the rotation angle determined by the neural network and the actual rotation angle 304, which is available as a further input, are compared with each other. This comparison may be made, for example, by forming a difference or performing a weighted comparison of the determined rotation angle and the actual rotation angle.

From this comparison, the neural network may now modify its parameters (the size of the matrices K and/or the values of the parameters contained therein) in step 306 as part of a learning process. With these new parameters, the last processed image or all last processed images are now processed again and the necessary rotation angle is determined. In step 305 a new comparison is then made with the actual rotation angle 304 and, if necessary, the parameters are modified again in step 306.

This procedure is usually carried out until the deviation between the determined rotation angle and the actual rotation angle for all training data falls below a certain threshold. The parameters then obtained are used in step 307 as final parameters of the neural network after this training, until a next training cycle of the neural network is performed, for example during a break in operation of the container treatment machine.

The invention claimed is:

1. A container treatment machine for treating containers, the container treatment machine comprising a treatment unit for treating containers and container receptacles in which containers can be received so as to be rotatable about an axis, the container treatment machine comprising a camera for capturing an image of a container transported in a container receptacle upstream of the treatment unit and an alignment module, wherein the alignment module is configured to rotate the container to a target attitude by controlling the container receptacle, wherein the alignment module comprises a neural network which, by processing the image of the container transported in the container receptacle upstream of the treatment unit, is able to determine a necessary rotation of the container from its current position to the target attitude, and the alignment module is able to control the rotation of the container receptacle depending on the determined rotation, and wherein the neural network is adapted to learn current positions of containers in relation to the target attitude from images acquired during operation of the container treatment machine.

2. The container treatment machine of claim 1, wherein the neural network is a Deep Neural Network (DNN) or a Convolutional Neural Network.

3. The container treatment machine according to claim 1, wherein the target attitude is determined based on an alignment feature of the container.

4. The container treatment machine according to claim 3, wherein the container treatment machine comprises an input unit for an operator to input a type of container and/or a type of the alignment feature, based on which the neural network enables determination of the target attitude.

5. The container treatment machine according to claim 1, wherein the container treatment machine comprises at least one of a labeling machine, a printing machine, a direct printing machine, an inspection machine, and a packer.

6. The container treatment machine according to claim 1, wherein the container receptacle comprises a turntable and a rotatable centering bell, enabling a container to be clamped and rotated between the turntable and the rotatable centering bell.

7. A method for aligning a container in a container receptacle of a container treatment machine, wherein the container is aligned into a target attitude before a treatment step is performed on the container by means of a treatment unit of the container treatment machine, wherein the container is rotated about an axis from a current position to the target attitude in a container receptacle, wherein the container treatment machine comprises a camera, which captures an image of the container transported in the container receptacle upstream of the treatment unit, and an alignment module that rotates the container to the target attitude by controlling the container receptacle, wherein the alignment module comprises a neural network that determines a necessary rotation of the container from its current position to the target attitude by processing the image of the container transported in the container receptacle upstream of the treatment unit, and the alignment module controls the rotation of the container receptacle depending on the determined rotation, and wherein the neural network is adapted to learn current positions of containers relative to the target attitude from images of containers captured during operation of the container treatment machine.

8. The method of claim 7, wherein the neural network is a pre-learned neural network.

9. The method of claim 7, wherein the container treatment machine comprises an input unit with which an operator inputs a container type and/or a type of an alignment feature, and wherein the neural network determines the target attitude based on the input container type and/or the input alignment feature.

10. The method according to claim 7, wherein the neural network, for determining the rotation in exactly one image of the container in its current position, in a first step searches for an alignment feature by means of which the target attitude of the container is defined and, if the alignment feature is found at least partially in the image of the container, determines the rotation from the position of the alignment feature in the image and the target attitude of the alignment feature;

and wherein in a second step, if the alignment feature is not found at least partially in the exactly one image, the neural network determines a possible position of the alignment feature based on the information present in the image and the alignment module causes a rotation of the container in the container receptacle based on the possible position of the alignment feature, wherein in a third step a second image of the container is taken in the rotated position and the neural network searches for the alignment feature in the second image and, if the alignment feature is found at least partially in the image of the container, determines the rotation from the position of the alignment feature in the image and from the target attitude of the alignment feature.

11. The method of claim 10, wherein the neural network learns from a result of the second step and the third step.

12. The container treatment machine of claim 1, wherein the containers treated by the container treatment machine include one or more of bottles and cans.

* * * * *